United States Patent [19]

Greil et al.

[11] Patent Number: 5,106,793
[45] Date of Patent: Apr. 21, 1992

[54] PROCESS FOR THE HOT ISOSTATIC COMPRESSION OF SILICON NITRIDE BODIES REINFORCED WITH CARBIDE FIBRES AND CARBIDE WHISKERS

[75] Inventors: Peter Greil, Waiblingen; Klaus Nickel; Michael Hoffmann, both of Stuttgart; Günter Petzow, Leinfelden-Echterdingen, all of Fed. Rep. of Germany

[73] Assignee: Max-Planck-Gesellschaft zur Foederung der Wissenschaften e.V., Goettingen, Fed. Rep. of Germany

[21] Appl. No.: 399,504

[22] PCT Filed: Mar. 15, 1988

[86] PCT No.: PCT/EP88/00205
§ 371 Date: Sep. 11, 1989
§ 102(e) Date: Sep. 11, 1989

[87] PCT Pub. No.: WO88/07029
PCT Pub. Date: Sep. 22, 1988

[30] Foreign Application Priority Data

Mar. 17, 1987 [DE] Fed. Rep. of Germany ....... 3708689

[51] Int. Cl.$^5$ .............................................. C04B 35/58
[52] U.S. Cl. ...................................... 501/97; 501/96; 264/60; 264/65
[58] Field of Search ....................... 501/95, 97, 98, 96; 264/60, 65

[56] References Cited

U.S. PATENT DOCUMENTS

| 4,495,123 | 1/1985 | Hunold et al. | 264/69 |
| 4,541,975 | 9/1985 | Honma et al. | 264/65 |
| 4,552,711 | 11/1985 | Raj et al. | 501/97 |
| 4,560,668 | 12/1985 | Hunold et al. | 501/97 |
| 4,564,601 | 1/1986 | Kriegesmann et al. | 264/65 |
| 4,603,116 | 6/1986 | Smith et al. | 501/97 |
| 4,717,535 | 1/1988 | Alderborn et al. | 264/65 |
| 4,719,078 | 1/1988 | Miyashita et al. | 264/65 |
| 4,810,678 | 3/1989 | Hirosaki et al. | 264/65 |
| 4,812,272 | 3/1989 | Heinrich et al. | 264/65 |
| 4,820,663 | 1/1989 | Mehrotra et al. | 501/95 |
| 4,840,763 | 6/1989 | Freitag | 264/65 |
| 4,855,262 | 8/1989 | Richon et al. | 501/97 |

FOREIGN PATENT DOCUMENTS 8605480 3/1986 PCT Int'l Appl. .

OTHER PUBLICATIONS

"Hot Isostatic Pressing for the Forming and Production of Ceramics" Hans T. Larker ASEA Journal 1981 vol. 54 No. 4 pp. 85-90.

Primary Examiner—William R. Dixon, Jr.
Assistant Examiner—Paul Marcentoni
Attorney, Agent, or Firm—Felfe & Lynch

[57] ABSTRACT

Carbide fiber- and carbide whisker-strengthened silicon nitride bodies are hot-isostatic pressed without encapsulation of the pressureless pre-sintered formed body at temperature between 1000° and 3000° C. in a nitrogen-protective gas atmosphere. At a low nitrogen partial pressure but high total gas pressure, a maximum consolidation can be achieved already at relatively low temperatures without destruction of the carbide fibers or carbide whiskers.

7 Claims, 6 Drawing Sheets

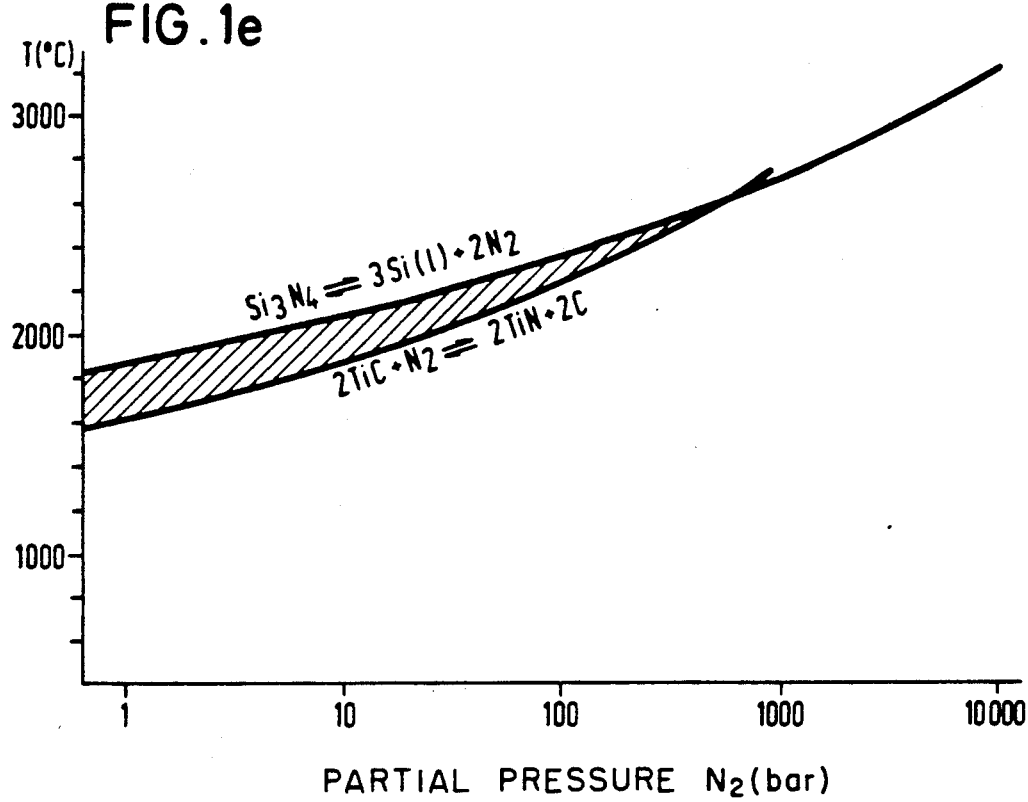
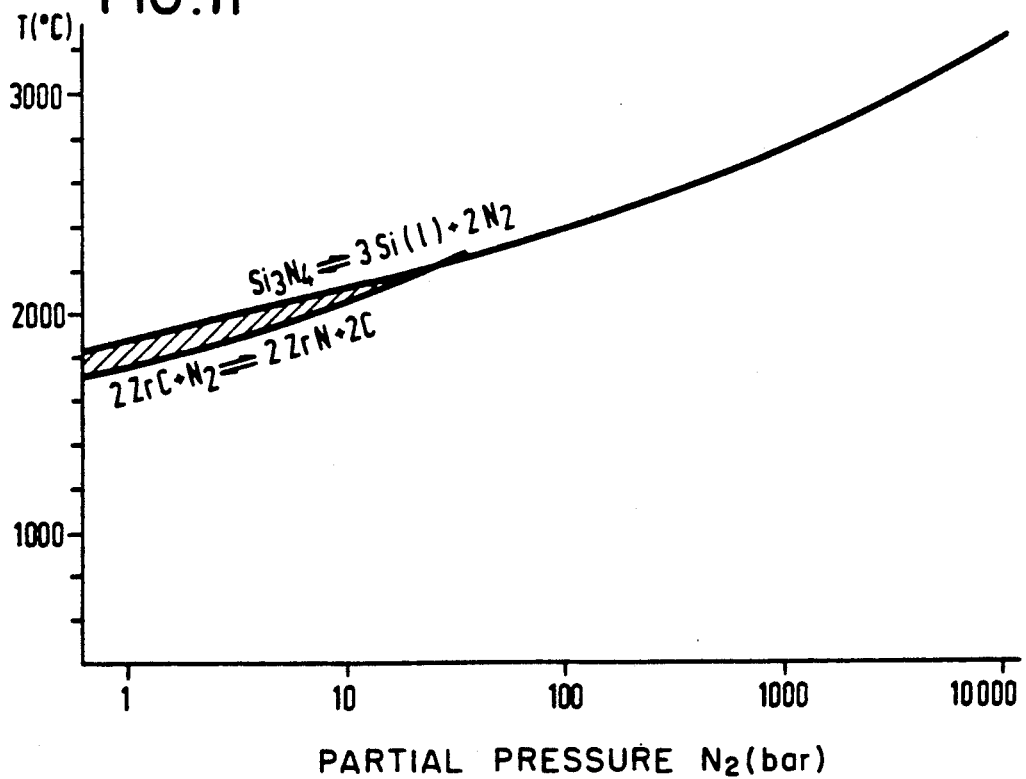

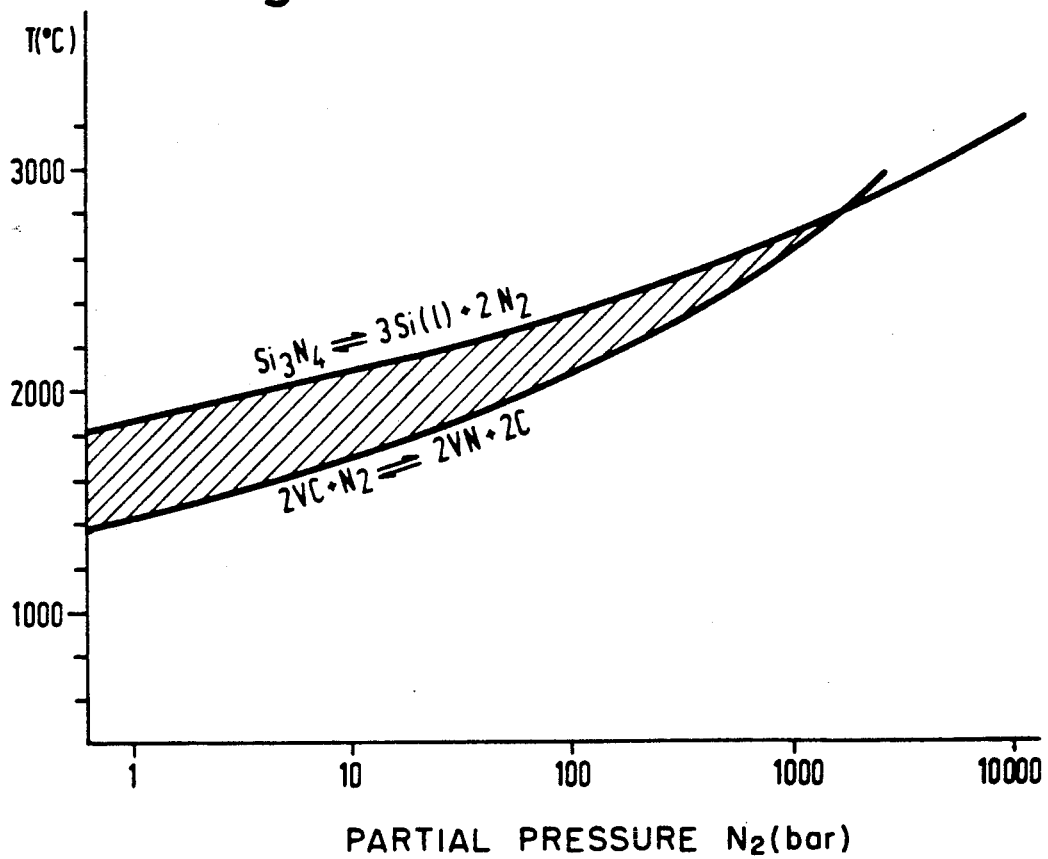

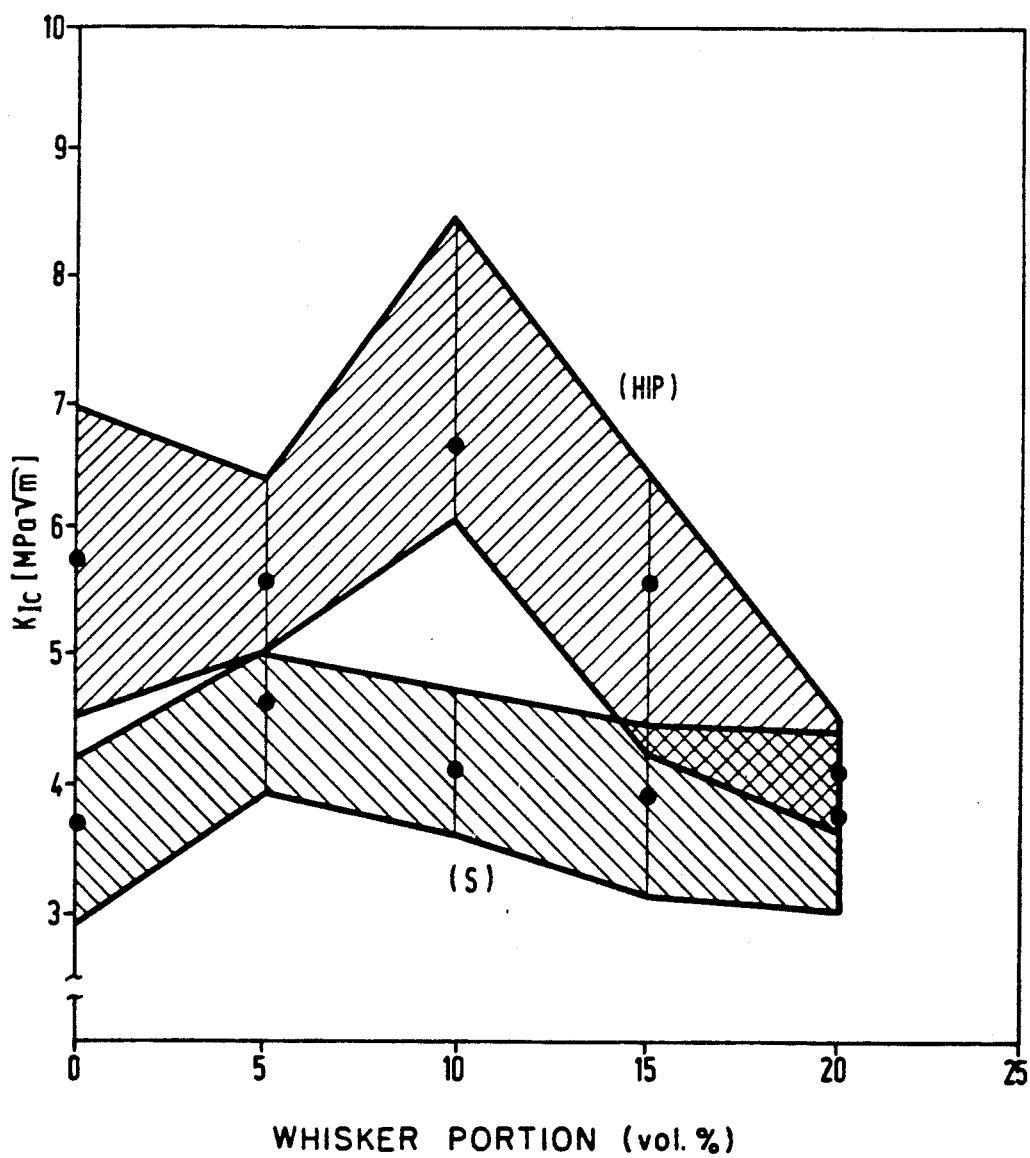

PROCESS FOR THE HOT ISOSTATIC COMPRESSION OF SILICON NITRIDE BODIES REINFORCED WITH CARBIDE FIBRES AND CARBIDE WHISKERS

FIELD OF THE INVENTION

The invention concerns a process for hot-isostatic pressing (HIP) of carbide fiber- and carbide whisker-strengthened silicon nitride bodies.

BACKGROUND OF THE INVENTION

Because of their outstandingly good properties with regard to heat- and oxidation-stability, silicon nitride ceramics have great importance as materials in engine construction, e.g. for the use in heat engines, as well as as forming and cutting tools in the case of metal working. The electrical and mechanical properties can thereby be further substantially improved by the introduction of carbide fibers or carbide whiskers (U.S. Pat. No. 4,507,224). Therefore, the production of silicon nitride ceramics strengthened with carbide fibers or carbide whiskers is of great importance.

The product of whisker-strengthened $Si_3N_4$ ceramics to give dense materials with improved mechanical properties, as are aimed for especially for engine construction, previously took place only by hot pressing or hot-isostatic pressing of encapsulated powder bodies. However, hot pressing is limited to bodies with simple, uniform geometry.

P. D. Shalek et al., Am. Ceram. Soc. Bull. 65 (1986), 351–265, describe the production of $Si_3N_4$ strengthened with SiC whiskers without hot pressing at 1600° to 1850° C., whereby dense bodies were achieved with up to 40 vol. % whisker proportion. However, this hot-isostatic pressing requires an encapsulation and the removal thereof after the consolidation.

Without encapsulation of the powder body, in the case of the process of hot-isostatic pressing, a decomposition of the carbide fibers and whiskers takes place according to the reaction metal carbide+nitrogen→metal nitride+carbon (metal=Si, Hf, Nb, Zr, Ta, Ti, V) which leads to a loss of the property-improving action of the fiber and whisker incorporation.

On the other hand, the high sinter temperature require, however, increased nitrogen pressures in order to prevent a decomposition of the $Si_3N_4$ matrix into silicon and nitrogen. Therefore, it is necessary, in the case of pressureless sintering, to use temperatures below 1900° C. in order to avoid a decomposition of the $Si_3N_4$ material in the case of the sintering according to the reaction.

$$Si_3N_4 \text{ (solid)} \rightarrow 3 \text{ Si (liquid)} + 2 N_2 \text{ (gas)} \quad (1)$$

In the case of gas pressure sintering (pressures in the range of up to some 10 MPa) and even more in the case of hot-isostatic pressing (up to some 100 MPa) in a nitrogen atmosphere, silicon nitride remains stable up to very high temperatures (e.g. up to above 2700° C. at 100 MPa).

By gas pressure sintering at 1700° to 2000° C. with an $N_2$ pressure of 10 bar, there could admittedly be produced also bodies with variable geometry with up to 20 wt.-% SiC whiskers but, for a complete consolidation, a proportion of up to 35 mole % sinter adjuvants is then necessary (Tamari et al., YogYo-Kyokai-Shi 94 (1986), 1177–1179). However, this high proportion of sinter adjuvants has the disadvantage that it leads to the formation of a correspondingly high glass portion in the sintered material which manifests itself in a drastic impairment of the mechanical high temperature properties.

However, in the case of hot-isostatic pressing of carbide fiber- or carbide whisker-strengthened silicon nitride, there must also be taken into account the decomposition of the carbide fibers or whiskers according to the above already-given equation "metal carbide+nitrogen→metal nitride+carbon". Therefore, for the total stability of the ceramic body, the decomposition reaction of $Si_3N_4$ and the decomposition reaction of the carbide fibers are to be taken into account, where these two reactions stand in a mutual relationship and disadvantageously influence the stability of the other component in question ($Si_3N_4$ or carbide fiber).

OBJECT OF THE INVENTION

Therefore, it was the task of the present invention to make available a process for hot-isostatic pressing of carbide fiber- and carbide whisker-strengthened silicon nitride bodies with which the above-mentioned disadvantages can be avoided and with which, in simple and economic manner, carbide fiber- and whisker-strengthened silicon carbide bodies can be produced which, on the basis of their mechanical, chemical and electrical properties and on the basis of their stability, fully satisfy the high requirements.

DESCRIPTION OF THE INVENTION

It has now been found that one can avoid the disadvantages of the previous processes and especially the decomposition of the components ($Si_3N_4$ and carbide fibers), when one works in a nitrogen-protective gas atmosphere at a high total gas pressure and a particular nitrogen partial pressure.

Therefore, the subject of the invention is a process for hot-isostatic pressing of silicon nitride formed bodies strengthened with carbide fibers or carbide whiskers from the group SiC, HfC, NbC, TaC, TiC, VC or ZrC in a nitrogen-containing atmosphere, wherein the formed body, presintered pressureless in a nitrogen-containing atmosphere, is, without encapsulation, hot-isostatic pressed at temperatures between 1000° and 3000° C. in a nitrogen-protective gas atmosphere under a nitrogen partial pressure which corresponds to the equation

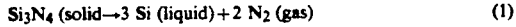
$$P_{N_2} \text{ (bar)} = (e)^{\frac{a - b \times T_S}{c \times T_S}} \quad (1)$$

in which $P_{N_2}$ signifies the $N_2$ partial pressure, $T_S$ is the temperature in °K, and e is the natural logarithm base, where the partial pressure lower limit is given by the values a=872 213, b=405.6 and C—−16.6 and the partial pressure upper limit, depending upon the carbide used, by the following values:

|      | a      | b     | c     |
|------|--------|-------|-------|
| SiC: | 505444 | 295.2 | −16.6 |
| HfC: | 159842 | 83.2  | −4.2  |
| NbC: | 95814  | 73.4  | −4.2  |
| TaC: | 106274 | 81.2  | −4.2  |
| TiC: | 143782 | 76.1  | −4.2  |
| VC:  | 114641 | 67.9  | −4.2  |
| ZrC: | 160552 | 80.9  | −4.2  |

WO-A-86/05480 discloses a process for pressureless sintering of ceramic bodies which are reinforced with carbide whiskers. The ceramic bodies manufactured according to this process can subsequently be subjected to hot-isostatic pressing in a nitrogen or argon atmosphere. For pre-sintering, temperatures up to 1750° C. and for hot-isostatic pressing temperatures up to 1800° C. are indicated. However, examples are only given therein for ceramic bodies based on aluminum oxide for which a hot-isostatic pressing process is carried out at a temperature of 1575° C. The special problems which occur during hot-isostatic pressing (HIP) of an $Si_3N_4$ form body containing carbide fibers are not mentioned. The process described therein does not provide a solution to these problems.

When sintering, one cannot omit nitrogen as the gas since, in case of a reduction of the nitrogen partial pressure, the upper limit of the sinter temperature drops drastically on the basis of equation (1).

The nitrogen partial pressure, which is to be adjusted for the hot-isostatic pressing of carbide fiber- or whisker-strengthened $Si_3N_4$ composite material without destroying matrix or fiber/whisker must, therefor, vary between an upper and a lower limit for the carbide in question. It has now been found that the particular limit can be given by the equation $$P_{N2} \text{ (bar)} = (e)^{\frac{a - b \cdot T_s}{c \times T_s}} \quad (2)$$

where $T_S$ is the sinter or HIP temperature in °K (K).

The values for the parameters a, b and c of equation (2) for the lower limit of the nitrogen partial pressure at which the $Si_3N_4$ is still stable at a given sinter temperature and which, therefore, must not be gone below is given by equation (10) below. Therefore, the lower limit of the nitrogen partial pressure is the same for all materials of the described type and has the parameters a = 872 213; b = 405.6; C = −16.6

The upper limit of the nitrogen partial pressure which can be used is given by the reactions (equations b 3 to 9)

| | |
|---|---|
| 2 HfC + $N_2$ → 2 HfN + 2 C | (3) |
| 2 NbC + $N_2$ → 2 NbN + 2 C | (4) |
| 3 SiC = 2 $N_2$ → 3 $Si_3N_4$ + 3 C | (5) |
| 2 TaC + $N_2$ → 2 TaN + 2 C | (6) |
| 2 TiC + $N_2$ → 2 TiN + 2 C | (7) |
| 2 VC + $N_2$ → 2 VN + 2 C | (8) |
| 2 ZrC + $N_2$ → 2 ZrN + 2 C | (9) | and must, therefore, be individually determined for each carbide.

Table 1 gives the parameters a, b and c from which the upper limit of the nitrogen partial pressure ($P_{N2}$) for the carbide used according to equation (2) can be calculated. These values are known from the literature (cf. Chase et al., (1075), JANAF thermochemical tables; Storms, E. K. (1967), The refractory carbides, Refractory materials 3, Academic Press, N.Y., U.S.A.; Toth, L. E. (1971) Transition metal carbides and nitrides, Refractory materials 7, Academic Press, N.Y. U.S.A.).

TABLE 1

Parameters a, b and c for the calculation of the upper limit of the usable nitrogen partial pressure

| | a | b | c |
|---|---|---|---|
| SiC: | 505444 | 295.2 | −16.6 |
| HfC: | 159842 | 83.2 | −4.2 |
| NbC: | 95814 | 73.4 | −4.2 |
| TaC: | 106274 | 81.2 | −4.2 |
| TiC: | 143782 | 76.1 | −4.2 |
| VC: | 114641 | 67.9 | −4.2 |
| ZrC: | 160552 | 80.9 | −4.2 |

According to the process of the invention, one works in the temperature range of 1000° to 3000° C. The upper temperature limit for the production of the composite ceramic is determined by the stability of the silicon nitride according to the reaction equation (1). It can be expressed by the equation $$T (°C.) = (872\ 213/(405.6 - 16.6\ ln\ (P_{N2})) - 273 \quad (10)$$

where the nitrogen partial pressure $P_{N2}$ is given in bar.

The lower temperature limit is determined by the stability in the presence of nitrogen of the carbide in question which is to be used as fiber or whisker. This means that the reactions according to the equations (3) to (9) must be avoided

BRIEF DESCRIPTION OF THE DRAWINGS

FIGS. 1a to 1g graphically illustrate the possible nitrogen partial pressures ($P_{N2}$) and temperature (T) conditions in each case for the carbides to be used at which one can work according to the invention. The cross-hatched area illustrates the possible region.

Figure 1A:
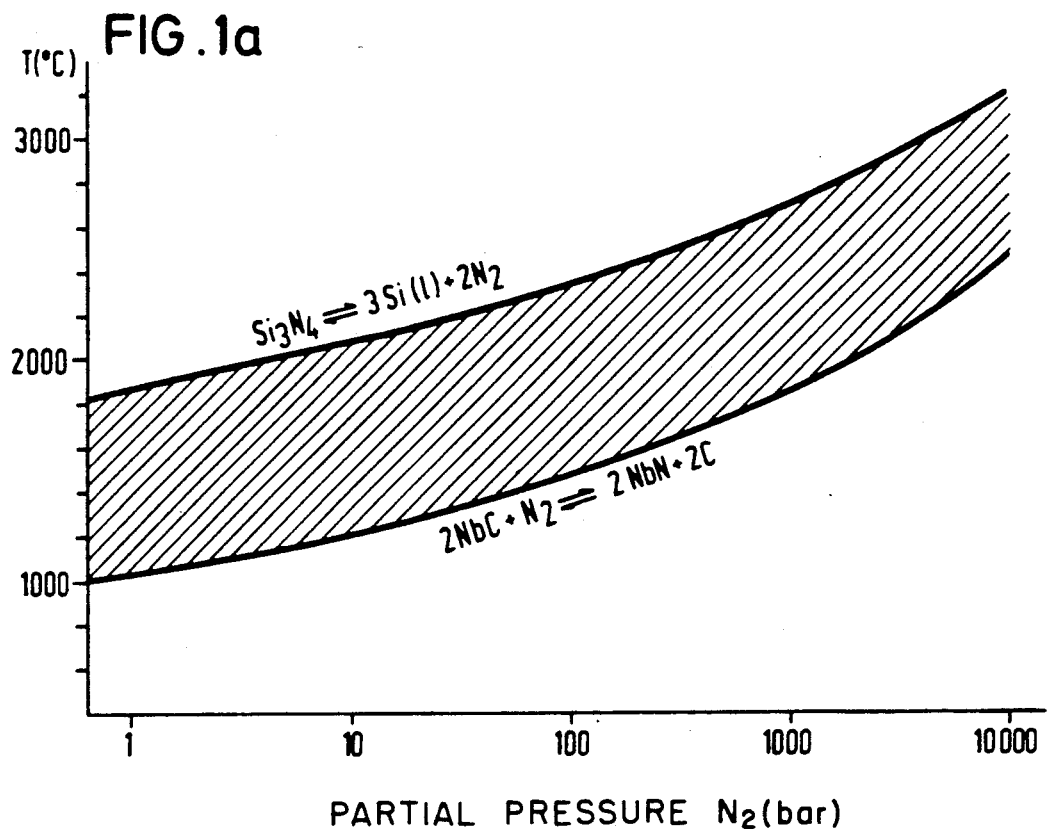
Figure 1B:
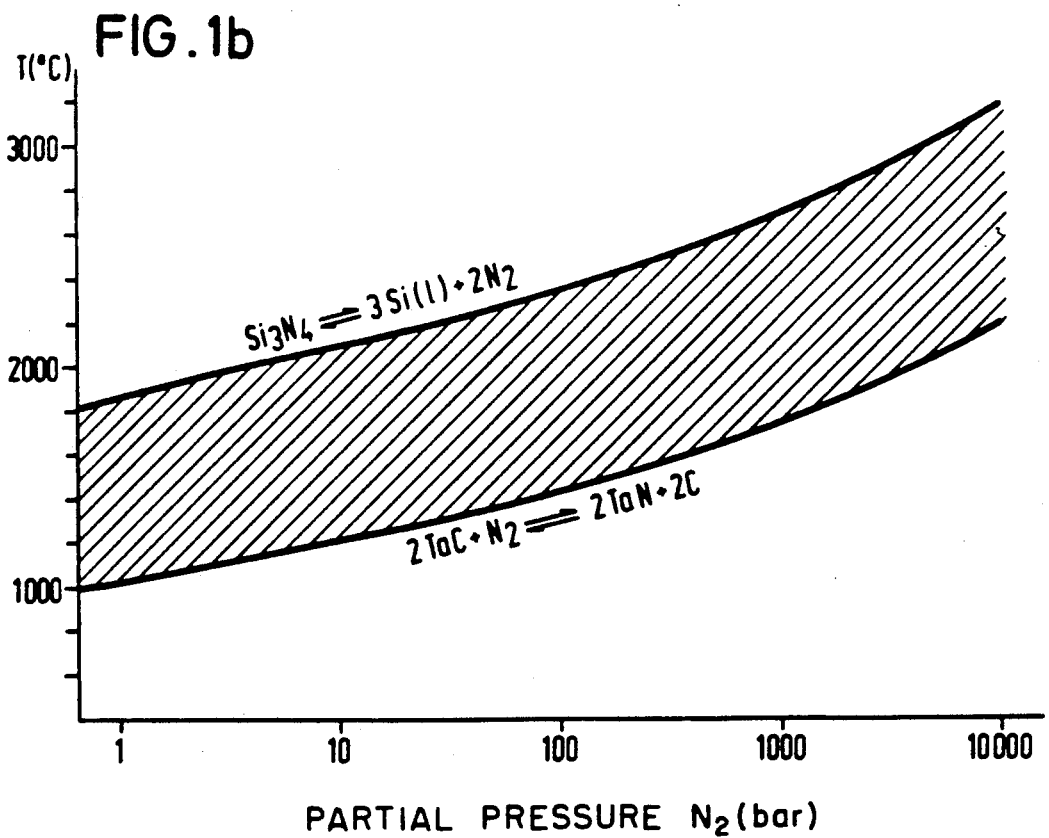
Figure 1C:
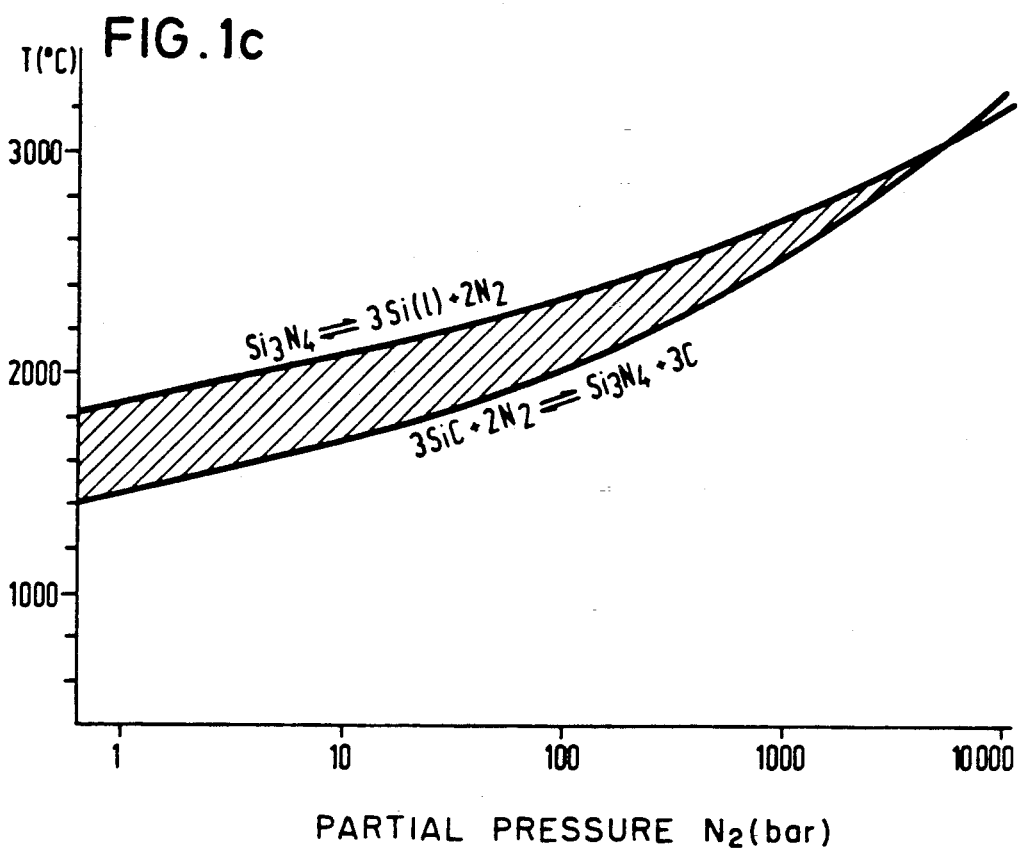
Figure 1D:
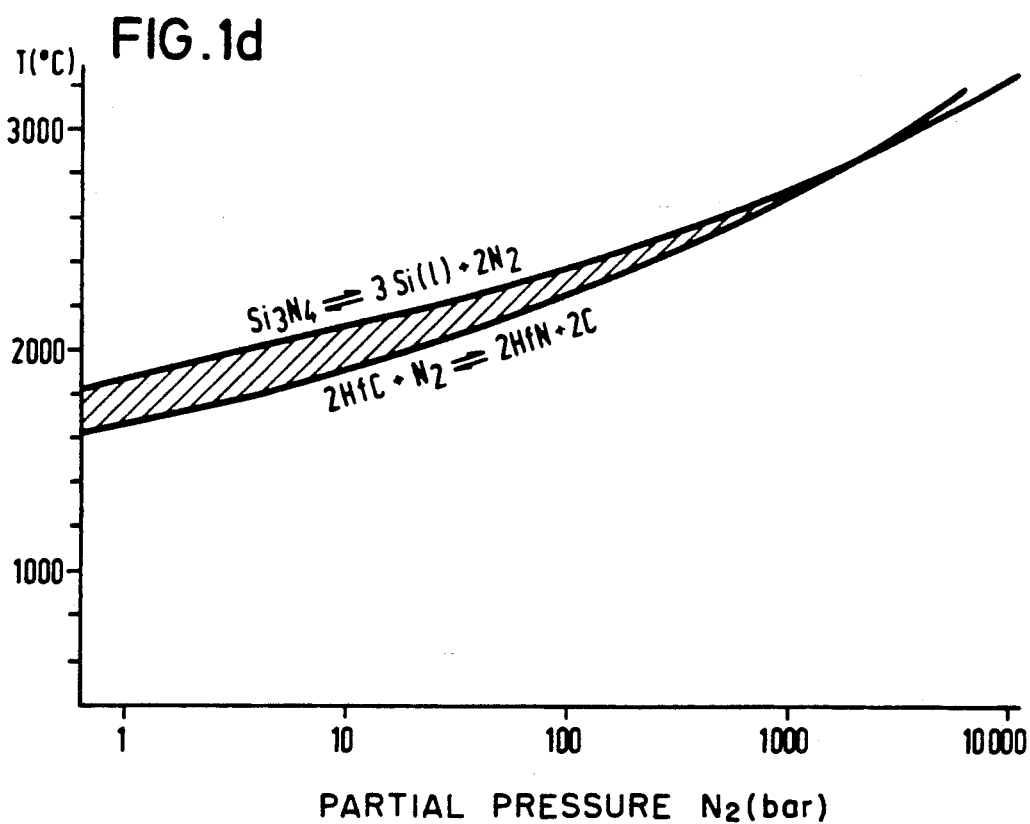
Figure 2:
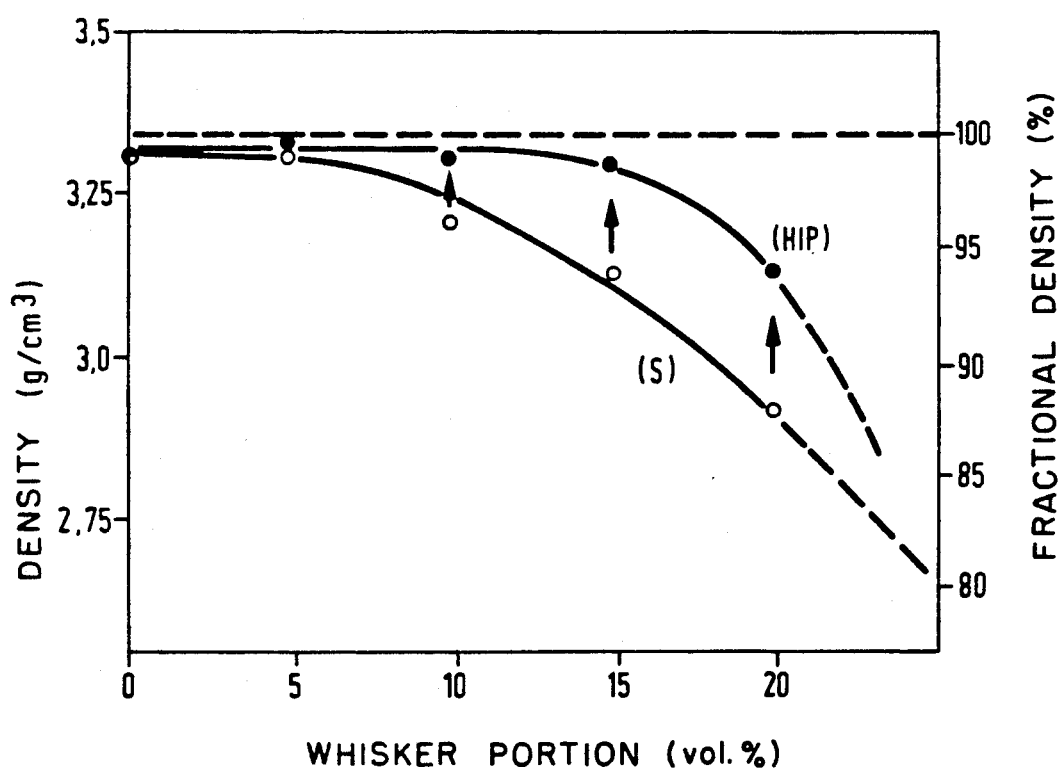

They show:

FIG. 1a the $P_{N2}$-T region for HIP of NbC fiber/whisker-strengthened $Si_3N_4$;

FIG. 1b the $P_{N2}$-T region for HIP of TaC fiber/whisker-strengthened $Si_3N_4$;

FIG. 1c the $P_{N2}$-T region for HIP of SiC fiber/whisker-strengthened $Si_3N_4$;

FIG. 1d the $P_{N2}$-T region for HIP of HfC fiber/whisker-strengthened $Si_3N_4$;

FIG. 1e the $P_{N2}$-T region for HIP of TiC fiber/whisker-strengthened $Si_3N_4$;

FIG. 1f the $P_{N2}$-T region for HIP of ZrC fiber/whisker-strengthened $Si_3N_4$;

FIG. 1g the $P_{N2}$-T region for HIP of VC fiber/whisker-strengthened $Si_3N_4$;

In FIGS. 1a-1g, temperature is plotted against $N_2$ partial pressure (bar);

In FIG. 2 density (g./$cm^3$ is plotted against proportion of whiskers (vol. %); and in FIG. 3 $K_{IC}$(MPa√m) is plotted against proportion of whickers (vol. %).

As a protective gas for the nitrogen-protective gas atmosphere any gas or gas mixture which is inert under the operating conditions can be used. The protective gas is preferably a noble gas, such as Ar, He, Ne, Xe or a mixture thereof.

The composition of the nitrogen-protective gas atmosphere is given as follows:

% nitrogen = 100 × $P_{N2}/P_{Hip}$;

and

% nobel gas = 100 − 100 × $P_{N2}/P_{Hip}$, where $P_{Hip}$ (bar) is the total pressure desired or necessary for technical reasons in the case of hot-isostatic pressing, the size of which lies in the usual pressure range employed for the process for the hot-isostatic pressing. In the process according to the invention, one usually works with a total gas pressure $P_{Hip}$ of at least 1000 bar.

The proportion of carbide fibers and/or carbide whiskers can be to up to 50 wt.−%, referred to the starting mixture. The lower limit of the carbide portion is, as a rule, about 0.1 wt. %, preferably 0.5 wt. % and especially 1 wt. %. The upper limit of the carbide portion preferably is 30 wt. % and especially 15 wt. %.

The starting mixture (powder body) for the process according to the invention can also contain additive materials and melt phases usual for such processes for the production of silicon nitride formed bodies, such as conventional sinter adjuvants (sinter additives). Preferred sinter adjuvants are $Y_2O_3$, $Al_2O_3$ and AlN, and especially powder mixtures thereof, or also $Y_3Al_5O_{12}$. The proportion of sinter additives preferably increases with increasing carbide content. In particular, the proportion of sinter additives is 5 to 15 wt. % (referred to the starting mixture), where the lower limit of 5 wt. % is preferably employed for the lower limit of the carbide proportion and the upper limit of 15 wt. % preferably for the upper limit of the carbide proportion. When $Y_2O_3$, $Al_2O_3$ and AlN are used as a powder mixture, the ratio of the sinter additive powder preferably lies in the limits: $Y_2O_3$ 80 to 40 wt. %; $Al_2O_3$ 10 to 30 wt. % and AlN 10 to 30 wt. %.

The process according to the invention is combined for hot-isostatic pressing with a preceding pressureless pre-sintering in a nitrogen atmosphere, preferably up to the achievement of a closed porosity (greater than 5%). The pre-sintering can take place in a known and usual way and with use of conventional additive materials, such as sinter adjuvant agents (sinter additives). Preferably, the above-mentioned sinter additives and especially powder mixtures of $Y_2O_3$, $Al_2O_3$ and AlN or $Y_3Al_5O_{12}$ are used. The preferably used proportion of sinter additives also corresponds to the above-mentioned preferred proportion ranges.

Sinter additives strongly reduce the mechanical properties of the ceramic, especially at high temperatures. In the case of sintering under increased gas pressure or in the case of processes which intend a post-treatment by hot-isostatic pressing, less of the additive materials are necessary in order to achieve a maximum density of a ceramic body. With the process according to the invention, it is now possible to keep the amount of additive materials, such as sinter adjuvant agents, low. A further advantage of the process according to the invention also consist in the fact that in the case of lower nitrogen partial pressure but high total gas pressure, a maximum consolidation can already be achieved at relatively low temperatures.

The following Example explains the invention in more detail without limiting it thereto.

EXAMPLE

A powder mixture consisting of 85 to 70 wt. % $Si_3N_4$, up to 15 wt/% β-SiC whiskers and 9.8 wt. % $Y_2O_3$, 1.7 wt. % $Al_2O_3$ and 3.5 wt. % AlN is homogeneously mixed by attrition in an organic liquid. The whisker-containing powder suspension is subsequently dried in a rotary evaporator and cold-isostatic pressed into sample bodies. The green density amounts to 2-2.1 g./cm³ (60-63% of theoretical density).

The composite ceramic is pre-sintered for 30 minutes at 1850° C. under an $N_2$ pressure of 1 bar (0.1 MPa) up to closed porosity. The density after pre-sintering reaches 3.3 to 3.15 g/cm³ for whisker contents of up to 15 wt. % (99 to 95% of theoretical density).

Subsequently, the pre-sintered sample body is capsuleless hot-isostatically post-consolidated (HIP process) at a temperature of 1900° C. for 10 minutes in a gas mixture of 1 vol. % $N_2$ and 99 vol. % Ar. The isostatic total pressure amounts to 1000 bar (100 MPa), where the $N_2$ partial pressure reaches 10 bar (a MPa). The density also increases in the case of samples with up to 15 wt. % SiC whisker content to above 3.3 g./cm³ (99% of the theoretical density) without a destruction of the SiC whiskers taking place in the sample body. FIG. 2 shows graphically the absolute density and relative density (fractional density in %) in relation to the whisker proportion.

If, on the other hand, one post-consolidates with an $N_2$ partial pressure of 1000 bar (100 MPa) (which corresponds to the above total pressure), a strong carbon formation with simultaneous destruction of the SiC whiskers on the sample surface is observed.

After the hot-isostatic post-consolidation, a distinct increase in the break resistance is recognized. FIG. 3 shows the $K_{IC}$ values in relation to the whisker proportion. Maximum values of the $K_{IC}$ of over 8.5 MPa m$^{\frac{1}{2}}$ are achieved with β-SiC whisker content of 10 wt. %.

In FIGS. 2 and 3, the curve (S) means the pre-sintering, the curve (HIP) the hot-isostatic post-consolidation.

Upon replacement of the SiC whiskers by HfC, NbC, TaC, TiC, VC or ZrC whiskers, working according to the above-given method and with the same amount proportions produced similar results are obtained.

We claim:

1. The method of hot isostatic pressing of a shaped silicon nitride body reinforced with carbide fibers or carbide whiskers selected from the group consisting of SiC, HfC, NbC, TaC, TiC, VC or ZrC in a nitrogen-containing atmosphere, which comprises subjecting said shaped body to pressureless presintering in a nitrogen-containing atmosphere, hot isostatically pressing said presintered body without encapsulation at a temperature between 1000° and 3000° C. in a protective gas atmosphere under a nitrogen partial pressure which corresponds to the equation $$P_{N2} \text{ (bar)} = (e)^{[\frac{a - b \times T_s}{c \times T_s}]}$$

wherein $P_{N2}$ is the $N_2$ partial pressure, $T_S$ is the temperature in °K, and e is the natural logarithm base, where the partial pressure lower limit is given by the values a=872 212, b=405.6 and c=−16.6 and the partial pressure upper limit, depending upon the carbide which is used, is given by the following values

|      | a      | b     | c     |
| ---- | ------ | ----- | ----- |
| SiC: | 505444 | 295.2 | −16.6 |
| HfC: | 159842 | 83.2  | −4.2  |
| NbC: | 95814  | 73.4  | −4.2  |
| TaC: | 106274 | 81.2  | −4.2  |
| TiC: | 143782 | 76.1  | −4.2  |
| VC:  | 114641 | 67.9  | −4.2  |

-continued

|  | a | b | c |
|---|---|---|---|
| ZrC: | 160552 | 80.9 | −4.2. |

2. The method of claim 1, wherein the protective gas is a noble gas or a noble gas mixture.

3. The method of claim 1, wherein the total gas pressure of nitrogen and protective gas is at least 1000 bar (100 MPa).

4. The method of claim 1, wherein the amount of carbide fibers or carbide whiskers in said silicon nitride body is up to 50 wt.−%, based on the starting mixture.

5. The method of claim 1, wherein the pressureless presintering is carried out in a nitrogen atmosphere up to closed porosity.

6. The method of claim 1, which is carried out in the presence of a known sintering additive selected from the group consisting of $Y_2O_3$, BeO, $Li_2O$, MgO, CaO, BaO, SrO, $Sc_2O_3$, $Al_2O_3$, $ZrO_2$ and mixtures thereof.

7. The method of claim 6, wherein the amount of sintering additive is 5 to 15 wt.−%, based on the starting mixture.

* * * * *